Figure 1:
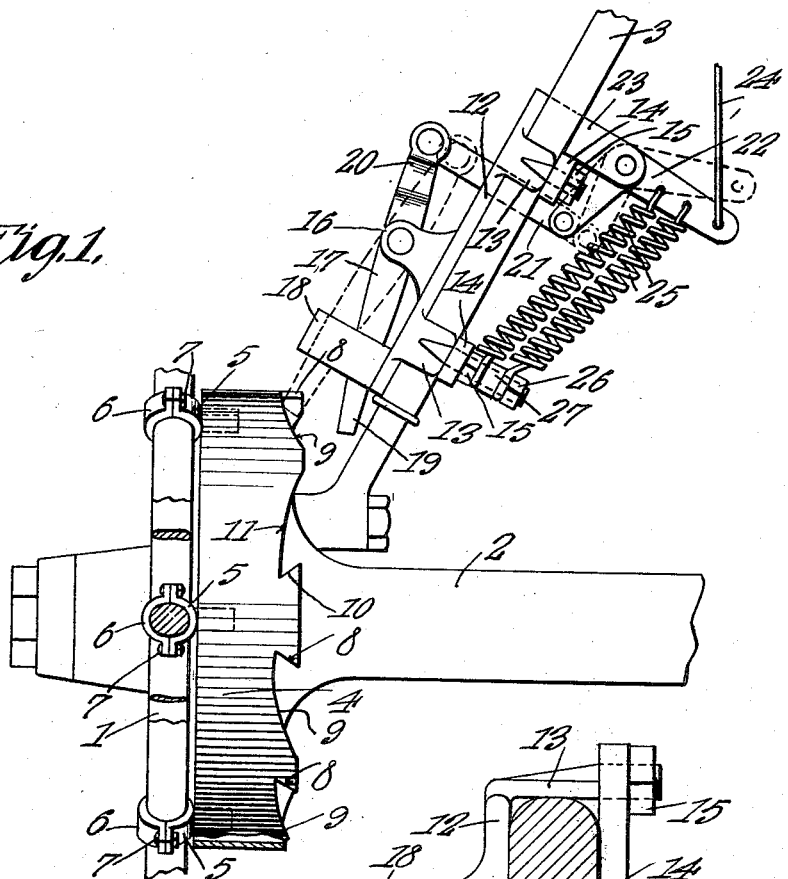

W. S. MULLIN.
SAFETY AUTOMOBILE CLUTCH.
APPLICATION FILED MAR. 27, 1916.

1,192,671.

Patented July 25, 1916.

Witnesses

W. S. Mullin, Inventor by C. A. Snow & Co., Attorneys

UNITED STATES PATENT OFFICE.

WINFIELD SCOTT MULLIN, OF HYNDMAN, PENNSYLVANIA.

SAFETY AUTOMOBILE-CLUTCH.

1,192,671.

Specification of Letters Patent. Patented July 25, 1916.

Application filed March 27, 1916. Serial No. 87,024.

*To all whom it may concern:*

Be it known that I, WINFIELD SCOTT MULLIN, a citizen of the United States, residing at Hyndman, in the county of Bedford and State of Pennsylvania, have invented a new and useful Safety Automobile-Clutch, of which the following is a specification.

The present invention is a safety clutch for use upon automobiles, and aims to provide a novel and improved device of that character for holding an automobile at a standstill upon hills, either when the car is moving up a hill or down an incline.

The present device serves as an auxiliary brake operable for preventing either the forward or backward movement of the car when on a hill, and is of such construction and operation that it permits the car to start, after being stalled or stopped while going up a hill, without the difficulty usually incident to the manual releasing of the brakes, when the clutch is thrown in. This is a constant source of trouble when traveling in hilly or mountainous country, since when a machine gets stalled or is stopped while going up a hill, it is difficult to release the brakes at the proper time. If the brakes are released prematurely, the car will start backward down the hill, which renders the starting of the car forward difficult, and subjects the machine to undue strains, and if the brakes are not released at the proper time, they will impede the forward movement of the car which is also objectionable.

It is the object of this invention to provide a clutch device adapted especially for use upon Ford automobiles, although with appropriate changes it can be used upon various other automobiles, which can be readily attached to the automobile, and which is operable to prevent the motion of the car either forward or backward, the clutch or brake being released automatically when the car is started.

It is also within the scope of the invention to provide a device of the nature indicated which is extremely simple and inexpensive in construction, which can be readily applied to the rear wheel and radius rod of a Ford or similar automobile, and which will serve its office in a thoroughly efficient, reliable and practical manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

The invention is illustrated in the accompanying drawing, wherein:—

Figure 2:
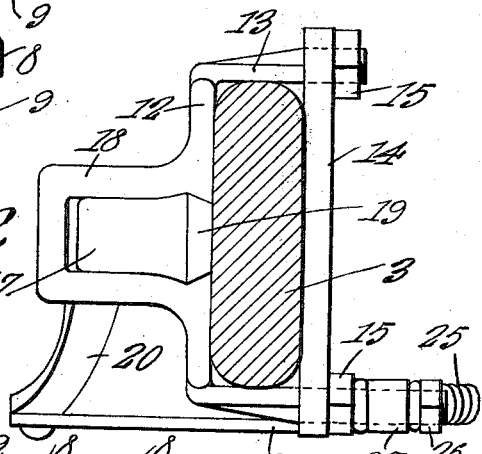
Figure 3:
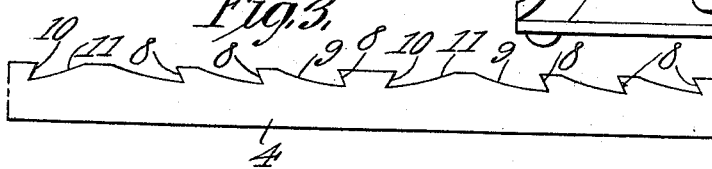

Figure 1 is a plan view of the device as applied to the rear wheel and radius rod. Fig. 2 is an enlarged end view of the parts carried by the radius rod, showing the radius rod in section. Fig. 3 is a reduced diagrammatical view of the ring which is attached to the rear wheel.

In the drawing, there is illustrated the rear wheel 1, axle housing 2 and radius rod 3 of a Ford automobile, although with appropriate changes the device can be applied to some other automobiles.

In carrying out the invention, a metallic ring 4 of suitable strength is secured to the inner side of the rear wheel 1, preferably by means of clamps embodying sections 5 attached to one edge of the ring 4, and sections 6 bolted or otherwise attached to the sections 5, as at 7. There are three or any other suitable number of clamps which embrace certain spokes of the rear wheel, to firmly attach the ring 4 to the wheel, with the ring surrounding the usual brake drum, so as to be inconspicuous. The free edge of the ring 4 is notched to provide a series of under cut or beveled shoulders 8 facing in the same general direction relative to the circumference of the ring, and edges 9 extending from the shoulders 8 to the edge of the ring. Said edge of the ring is also provided with oppositely facing under cut or beveled shoulders 10, and edges 11 extending from the shoulders 10 to the edge of the ring. The shoulders 8 are for stopping the backing of the car, while the shoulders 10 are for the purpose of stopping the forward movement of the car down a hill. It is preferable to provide more of the shoulders 8 than the shoulders 10, although any suitable number of each of them can be used. Coöperating with this clutch or brake ring 4, is a mechanism carried by the radius rod 3, and embodying a plate 12 fitting against the outer side of the radius rod 3. Said plate 12 is provided with integral U-clips 13 straddling the radius rod, and having bars 14 engaged upon the terminals thereof and resting against the inner side of the radius rod. Nuts 15 are threaded upon the terminals of the clips 13 whereby to fasten the plate 12 securely to the radius rod at the proper point adjacent the ring 4.

The plate 12 is provided with an outstanding ear or lug 16 between its ends to which is pivoted, between its ends, a pawl or dog 17. The dog 17 has a forwardly projecting arm slidable snugly within a rigid loop-shaped guide 18 integral with the rear end of the plate 12 and outstanding therefrom. The rear terminal of the dog 17 is of dove-tailed shape, as at 19, to properly engage the shoulders 8—10 of the ring 4. The dog 17 has a forwardly projecting downwardly offset arm 20 which is connected by a link 21 with one arm of a bell crank lever 22 that has its elbow pivoted to a bracket 23 projecting from the forward end of the plate 12 below the radius rod 3. The other arm of the bell crank lever 22 is connected by a rod 24 or any other suitable means to a hand lever, pedal, or other suitable means (not shown), for swinging the bell crank lever.

The dog 17 is moved to releasing position under the influence of coiled wire retractile springs 25 disposed side by side and having certain ends connected to the lever 22, while their other ends engage the lower extended terminal of the rear clip 13. A nut 26 is threaded upon said extended terminal to hold the ends of the spring thereon, and the ends of the spring are preferably separated by a spacer 27. By using two springs, should one break, the other will still be effective. The springs 25 normally swing the lever 22 to the full line position, as seen in Fig. 1, whereby to thrust the link 21 outwardly or toward the side of the machine, so that the dog 17 will be moved to releasing position. The terminal 19 of the dog is engageable with the shoulders of the ring 4 when the rod 24 is pulled forwardly.

In operation, the dog 17 is normally removed from the ring 4 under the influence of the springs 25, whereby there is no interference with the operation of the automobile. Now, supposing that the automobile is ascending a hill, should the engine stall or the machine be stopped, instead of relying on the ordinary brakes for preventing the backing of the machine, the rod 24 is pulled forwardly, whereby to swing the dog 17 against the edge of the ring 4, thereby to engage over the respective shoulder 8. Then, when the car backs a very slight amount, said shoulder 8 will bear against the terminal 19 of the dog 17, and due to the dove-tailed shape of said terminal, and the under cut shape of the shoulder, the dog is prevented from swinging away from the ring 4, it being kept in mind that the ring bears against the dog due to the tendency of the car to back down the hill. The rod 24 can then be released. When the automobile is started again, the ring 4 in being rotated with the rear wheel 1, will carry the respective shoulder 8 away from the dog 17, and said dog will immediately swing away from the ring under the influence of the springs 25, whereby the dog is automatically released as soon as the automobile moves forwardly, there being no hindrance to the forward motion of the machine. The automobile can thus be started on the hill without trouble. When the automobile is descending a hill, the dog 17 will be moved into engagement with one of the shoulders 10, to prevent the further forward movement of the automobile down the hill, when the machine is stopped, and when it is desired to start the automobile, the dog can either be released manually, or by backing the car slightly, the dog will be released automatically.

The present device can be used at either side of the automobile, that is, in connection with either rear wheel, or two of the devices can be used upon heavy cars, trucks, and the like, both being operated simultaneously.

Having thus described the invention, what is claimed as new is:

1. A device of the character described comprising a ring attachable to an automobile wheel and having one edge notched to provide under cut shoulders, and a dog having a terminal engageable with said shoulders.

2. A device of the character described comprising a ring attachable to an automobile wheel and having one edge notched to provide under cut shoulders facing in opposite directions, and a dog having a dove-tail shaped terminal engageable with said shoulders to prevent the rotation of the ring in either direction.

3. A device of the character described comprising a notched ring attachable to an automobile wheel, a plate having U-clips projecting to one side to straddle a radius rod and a lug projecting to the opposite side, means engageable with said clips for clamping said plate against said rod, a dog pivotally connected with said lug and swingable into engagement with said ring, and means for swinging said dog.

4. A device of the character described, comprising a notched ring attachable to an automobile wheel, a plate attachable to a radius rod and having a lug outstanding therefrom, and an outstanding loop-shaped guide, a dog pivoted between its ends to said lug and having one arm working in said guide, the terminal of said arm being engageable with said ring, and means connected to the other arm of the dog for swinging the same.

5. A device of the character described comprising a notched ring attachable to an automobile wheel, a plate attachable to a radius rod and having a lug between its ends, an outstanding loop-shaped guide at one end, and a bracket at its other end, a dog pivoted between its ends to said lug and having one arm working in said guide, said arm having its terminal engageable with said ring, the other arm of the dog being offset, a lever pivoted to said bracket, a link connecting the second mentioned arm of the dog and said lever, and a spring connected to said lever for swinging the dog away from said ring.

In testimony that I claim the foregoing as my own, I have hereto affixed my signature in the presence of two witnesses.

WINFIELD SCOTT MULLIN.

Witnesses:
H. SOMERS FISCHER,
M. H. KRAMER.